US012558288B2

(12) United States Patent
Ford et al.

(10) Patent No.: US 12,558,288 B2
(45) Date of Patent: Feb. 24, 2026

(54) APPARATUS FOR CONNECTING A MASSAGE GUN TO A MASSAGE CANE

(71) Applicants: Hunter Thomas Ford, Santa Barbara, CA (US); Robert Ferer, Santa Barbara, CA (US); Grant Amaral Draper, Encinitas, CA (US)

(72) Inventors: Hunter Thomas Ford, Santa Barbara, CA (US); Robert Ferer, Santa Barbara, CA (US); Grant Amaral Draper, Encinitas, CA (US)

( * ) Notice: Subject to any disclaimer, the term of this patent is extended or adjusted under 35 U.S.C. 154(b) by 930 days.

(21) Appl. No.: 17/838,077

(22) Filed: Jun. 10, 2022

(65) Prior Publication Data

US 2022/0395427 A1 Dec. 15, 2022

Related U.S. Application Data

(60) Provisional application No. 63/209,950, filed on Jun. 11, 2021.

(51) Int. Cl.
*A61H 23/00* (2006.01)

(52) U.S. Cl.
CPC .... *A61H 23/004* (2013.01); *A61H 2201/0119* (2013.01)

(58) Field of Classification Search
CPC .... A61H 23/004; A61H 23/006; A61H 7/003; A61H 37/00; A61H 23/0254; A61H 23/00; A61H 23/02; A61H 1/006–008; B25G 1/04; B25G 1/102
See application file for complete search history.

(56) References Cited

U.S. PATENT DOCUMENTS

| | | | | | |
|---|---|---|---|---|---|
| 4,403,432 | A * | 9/1983 | Biance | E01H 5/068 | 172/445.2 |
| 5,848,980 | A * | 12/1998 | Demerais | A61H 23/02 | 601/135 |
| 6,261,251 | B1 * | 7/2001 | Meyers | A61H 23/02 | 601/134 |
| 7,025,736 | B1 * | 4/2006 | Lawrence | A61H 23/02 | 403/177 |
| 9,168,196 | B2 * | 10/2015 | Dagan | A61H 39/04 | |
| 10,952,921 | B1 * | 3/2021 | Kesner | A61H 1/00 | |
| 11,166,863 | B2 | 11/2021 | Wersland et al. | | |
| 2022/0104997 | A1 | 4/2022 | Lawrie | | |

FOREIGN PATENT DOCUMENTS

KR 20100006361 U 6/2010

OTHER PUBLICATIONS

"Talon | The Massage Gun That Literally Has Your Back", Apr. 22, 2022.
"Upgraded Trigger Point Massager for Back, Leg, Arm, Neck, Shoulder, Lower Body and Muscle Pains Deep Pressure Tissue Self Thera Massage, Handheld Hook Cane Buddy Stick Tools", Apr. 22, 2022.

* cited by examiner

*Primary Examiner* — Margaret M Luarca
*Assistant Examiner* — Sarah B Lederer
(74) *Attorney, Agent, or Firm* — Seyfarth Shaw LLP

(57) ABSTRACT

An apparatus for connecting a massage gun to a massage cane includes a support platform for supporting the massage gun, the support platform comprising a fastening mechanism for fastening the massage gun to the support platform. The apparatus also includes a base for attaching the apparatus to the massage cane. The apparatus further includes a separating structure for connecting the base to the support platform.

20 Claims, 9 Drawing Sheets

APPARATUS FOR CONNECTING A MASSAGE GUN TO A MASSAGE CANE

CROSS-REFERENCE TO RELATED APPLICATION

The present application claims the benefit of U.S. Provisional Patent Application No. 63/209,950, filed on Jun. 11, 2021, and titled "A DEVICE FOR CONNECTING MASSAGE GUNS TO MASSAGE CANES," the disclosure of which is expressly incorporated by reference in its entirety.

FIELD OF THE DISCLOSURE

The present disclosure relates generally to massage devices, and more specifically to a method and apparatus for connecting a motorized massage device to a hand-held massage tool.

BACKGROUND

Percussion devices, otherwise known as massage guns or motorized massage devices, have become popular because of their ability to relax the muscles. However, due to the size and shape of such devices, it may be difficult to reach some muscles of the body. In some examples, it may be difficult to reach musculature along the spine. In many cases, the musculature along the spine may be tight and in need of a massage. The difficulty in reaching some muscles, such as the musculature along the spine, may be exasperated due to a person's limited range of motion. This may be particularly true for people with a limited range of shoulder motion, who could increasingly benefit from this type of treatment. Additionally, in order to reach certain muscles, such as the upper trapezius, without assistance, one must contract that muscle while bringing the massage gun to it. This can limit the depth and effectiveness of the percussion massage on the area. Oftentimes, people must rely on someone else to use these devices on them to properly reach these muscles.

Trigger point massagers and self-myofascial release canes, also called massage canes or hand-held massage tools, have the opposite problem. These massage canes provide increased ability to massage more areas on your own; however, they are limited to static massages, such as trigger point therapy, and do not allow for dynamic massages, such as percussion therapy.

SUMMARY

In one aspect of the present disclosure, an apparatus for connecting a massage gun to a massage cane is presented. The apparatus includes a support platform for supporting the massage gun. The support platform includes a fastening mechanism for fastening the massage gun to the support platform. The apparatus also includes a base for attaching the apparatus to the massage cane. The apparatus further includes a separating structure for connecting the base to the support platform.

Another aspect of the present disclosure is directed to method for attaching a massage gun to a massage cane. The method includes placing a massage gun connecting apparatus on a curved portion of the massage cane. The method also includes securing the massage gun connecting apparatus to the curved portion via one or more base bolts. The method further includes fastening the massage gun to a support platform of the massage gun connecting apparatus via a fastening mechanism.

Aspects generally include a method and apparatus, as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1A:
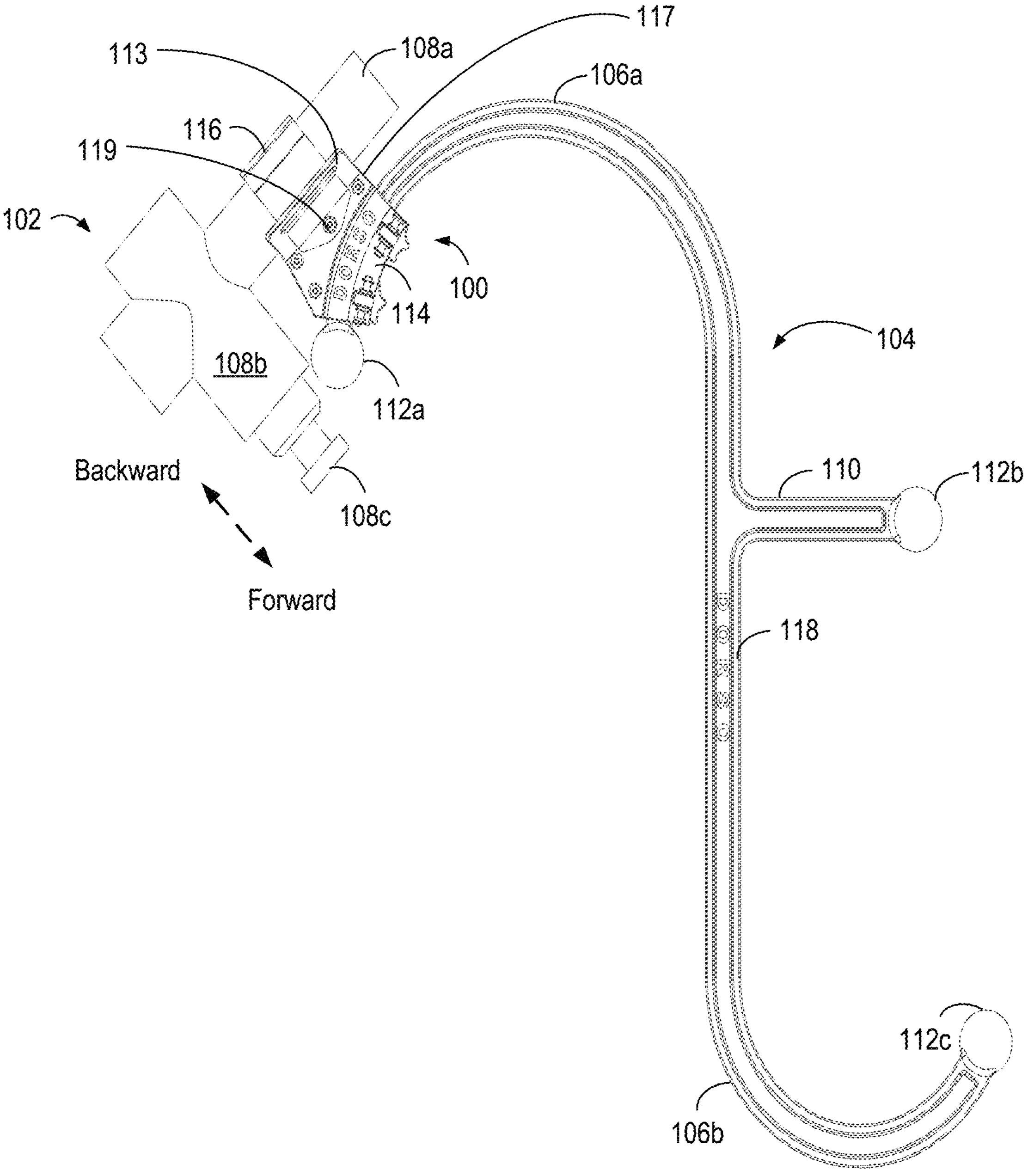
FIG. 1A is a diagram illustrating a side view of an example of a massage gun connecting apparatus for connecting a massage gun to a massage cane, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with motorized massage guns, aspects of the present disclosure can be applied to other motorized massage devices and/or technologies.

As discussed, massage guns have become popular because of their ability to relax the muscles. The percussion device may also be referred to as a percussion device or a motorized massage device. However, due to the size and shape of such devices, it may be difficult to reach some muscles of the body. In some examples, it may be difficult to reach musculature along the spine. In many cases, the musculature along the spine may be tight and in need of a massage. The difficulty in reaching some muscles, such as the musculature along the spine, may be exasperated due to a person's limited range of motion. This may be particularly true for people with a limited range of shoulder motion, who could increasingly benefit from this type of treatment. Additionally, in order to reach certain muscles, such as the upper trapezius, without assistance, one must contract that muscle while bringing the massage gun to it. This can limit the depth and effectiveness of the percussion massage on the area. Oftentimes, people must rely on someone else to use these devices on them to properly reach these muscles.

In contrast to massage guns, trigger point massagers and self-myofascial release canes increase a person's ability to massage areas on their own. However, these devices are limited to static massages, such as trigger point therapy, and do not allow for dynamic massages, such as percussion therapy. Trigger point massagers and self-myofascial release canes may also be referred to as massage canes or hand-held massage tools. For ease of explanation, aspects of the present disclosure will refer to trigger point massagers and self-myofascial release canes as massage canes. Therefore, it may be desirable to integrate a massage gun with a massage cane. Still, to prevent consumers from having to purchase a new device, it may be desirable to provide an apparatus to connect the massage gun with the massage cane, such that a person may apply dynamic pressure, via the massage gun, to hard to reach muscles, such as musculature along the spine.

Various aspects of the present disclosure are directed to an apparatus for connecting a massage gun to a massage cane. In some such aspects, the apparatus includes a support platform for supporting the massage gun. The support platform may include a fastening mechanism for fastening the massage gun to the support platform. The apparatus also includes a base for attaching the apparatus to the massage cane. The apparatus further includes a separating structure for connecting the base to the support platform. In some aspects, the massage gun connecting apparatus may be attached to a curved portion of the massage cane. The massage gun connecting apparatus may be secured to the curved portion via one or more base bolts. Additionally, the massage gun may be fastened to a support platform of the massage gun connecting apparatus via a fastening mechanism.

Particular aspects of the subject matter described in this disclosure can be implemented to realize one or more of the following potential advantages. In some aspects, the described apparatus (e.g., device) for connecting a massage gun to a massage cane provides the ability to apply percussion therapy to muscles that are typically difficult to reach when using a stand-alone massage gun by oneself. According to various aspects of the present disclosure, the apparatus for connecting the massage gun to the massage cane device increases leverage to the massage gun, thereby, allowing more force to be applied. Additionally, the apparatus increases a range of motion associated with the massage gun, thereby reducing a need for a user to reach and strain and improving a relaxation of the muscles being targeted by the percussion therapy. Furthermore, the apparatus improves the freedom and autonomy to massage oneself, rather than relying on a second party for assistance.

FIG. 1A is a diagram illustrating a side view of an example of a massage gun connecting apparatus 100 for connecting a massage gun 102 to a massage cane 104, in accordance with various aspects of the present disclosure. For ease of explanation, the massage gun connecting apparatus 100 may be referred to as the connecting apparatus 100. As shown in the example of FIG. 1, the massage cane 104 includes two curved ends 106*a* and 106*b* connected via a straight handle 118 (e.g., cane handle 118). A protrusion 110 may extend outwardly from the cane handle 118. In some examples, the protrusion 110 may be at a ninety-degree angle in relation to the cane handle 118. A trigger point ball 112*a*, 112*b*, and 112*c* may be defined at a respective end of each curve end 106*a* and 106*b*, and also at the end of the protrusion 110. Aspects of the present disclosure are not limited to massage cane 104 with two curved ends 106*a* and 106*b* and one protrusion 110. In some aspects, the massage cane 104 may have a single curved end 106*a* and more protrusions 110 or no protrusions 110.

In some aspects, the cane 104 and the connecting apparatus 100 may be made of plastic or another type of material. The material used for the massage gun 102 may vary based on a manufacturer and/or type of massage gun 102. Aspects of the present disclosure are not limited to a particular type of material for the cane 104, massage gun 102, and/or connecting apparatus 100. The strap 116 may be made of various types of material, such as elastic material, that may stretch, fold, and/or bend. Aspects of the present disclosure are not limited to using the strap 116 to secure the massage gun 102 to the connecting apparatus 100 and/or the support platform 113. Other fastening systems or fastening devices may be used, such as a clamp or a hook and loop fastening system.

As shown in the example of FIG. 1A, the massage gun 102 may be secured to the connecting apparatus 100 and the connecting apparatus 100 may be attached to the cane 104, such that the massage gun 102 is connected to the cane 104. In some examples, a base 114 of the connecting apparatus 100 may be affixed to a portion of the massage cane 104, such as a portion of a first curved end 106*a*. In the example of FIG. 1A, the connecting apparatus 100 is affixed to an end of the first curved end 106*a* that is adjacent to a first trigger point ball 112*a*. Aspects of the present disclosure are not limited to attaching the connecting apparatus 100 to the first curved end 106*a*, the connecting apparatus 100 may be attached (e.g., fastened) to other portions of the cane 104, such as the second curved end 106*b*, the handle 118, the protrusion 110, or another portion of the cane 104 that is not shown in the example of FIG. 1A.

In some examples, the connecting apparatus 100 may be securely fastened to the cane 104 via one or more fastening devices. In some examples, one or more fastening devices may be integrated (e.g., embedded) into the base 114 of the connecting apparatus 100. Additionally, or alternatively, screws, bolts, and/or other types of fasteners may be used to securely fasten the connecting apparatus 100 to the cane 104. In one example, the connecting apparatus 100 may be securely fastened to the cane 104 via bolts, such as eye bolts, and screw caps. In some examples, the base 114 of the connecting apparatus 100 may include an indentation, such as a circular indentation, for fitting the connecting apparatus 100 to massage canes with different shapes, such as different body widths.

As shown in the example of FIG. 1A, the massage gun 102 includes a handle 108*a* (e.g., gun handle), a body 108*b*, and a massage head 108*c*. The massage head 108*c* moves in a forward and backward direction (as shown by the arrows in FIG. 1A) to dynamically apply pressure to a user's body. In some examples, when the massage gun 102 is attached to the connecting apparatus 100, the massage head 108*c* faces toward the cane handle 118. In some such examples, the massage head 108*c* may be at a forty-five-degree angle in relation to the cane handle 118. The massage head 108*c* may be placed at other angles in relation to the cane handle 118. The handle 108*a* of the massage gun 102 may be fastened to a support platform 113 of the connecting apparatus 100. The support platform 113 may be attached to the base 114 via a separating structure 117. The separating structure 117 may extend vertically from the base 114. In some examples, the support platform 113 may include padding, such as adhesive padding, made of material, such as, but not limited to, foam or neoprene, to prevent the massage gun 102 from slipping or turning during use. Additionally, a strap 116 may secure the handle 108*a* to the support platform 113. The strap 116 may be a hook and fastener strap (e.g., Velcro™) or another type of strap (e.g., fastening mechanism) for securing the massage gun 102 to the platform 113. Aspects of the present disclosure are not limited to a single strap 116, additional straps 116 may be used to secure the handle 108*a* to the support platform 113. In some implementations, the straps 116 may be connected to the separating structure 117 via one or more bolts 119. The bolts 119 may also be a screw or another type of fastening mechanism. Each bolt may be secured via a nut. Additionally, in some implementations, the connecting apparatus 100 may be split into two symmetrical pieces (not shown in FIG. 1A), separating the connecting apparatus 100 longitudinally. The bolts 119 may be used to secure the symmetrical pieces together. As shown in the example of FIG. 1A, the strap 116 may pass through one opening in the platform 113, then pass over the handle 108*a*, through an opposite opening in the platform 113, and then loop back to secure the handle 108*a* to the platform 113.

Once the massage gun 102 is secured to the platform 113, the massage cane 104 may be used in a manner that may be similar to a conventional use. However, instead of providing trigger point massage, the cane 104 may be able to provide percussion massage via the massage gun 102 that is connected via the connecting apparatus 100. As such, the versatility of the massage gun 102 is improved because the massage gun 102 may reach the musculature of the spine more easily and efficiently.

In some examples, a first curved end 106*a* may be placed over a shoulder of a user, such that the massage head 108*c* may massage (e.g., apply dynamic pressure) one or more back muscles of the user. In such examples, the user may hold the cane handle 118 and/or the protrusion 110 to move the massage head 108*c* along the back or along another body part. The massage head 108*c* is not limited to massaging back muscles and may massage other muscles and/or body parts. In other examples, the cane 104 with the attached massage gun 102 may be used by one person to massage another person.

Figure 1B:
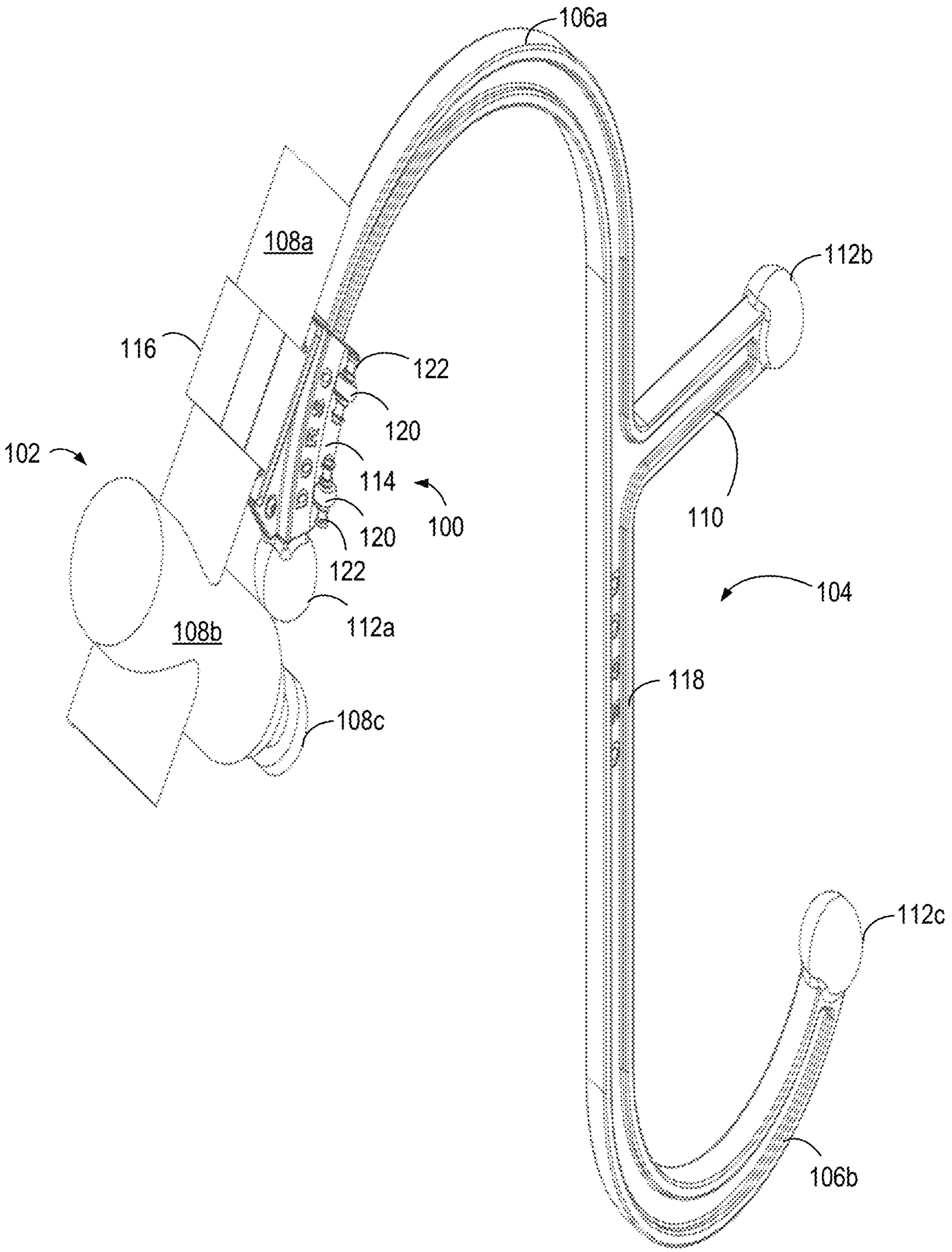
FIG. 1B is a diagram illustrating an example of a perspective view of a massage gun connecting apparatus for connecting a massage gun to a massage cane, in accordance with various aspects of the present disclosure.

FIG. 1B is a diagram illustrating an example of a perspective view of a massage gun connecting apparatus 100 for connecting a massage gun 102 to a massage cane 104, in accordance with various aspects of the present disclosure. In the example of FIG. 1B, the various elements associated with the massage gun connecting apparatus 100, the massage gun 102, and the massage cane 104 are the same as the elements described with respect to FIG. 1A. For brevity, a description of the elements in FIG. 1B that are the same as those described with reference to FIG. 1A is omitted.

As shown in the example of FIG. 1B, the connecting apparatus 100 may be securely fastened to the cane 104 via a pair of bolts 120, to distinguish the bolts 120 from other bolts, such as the bolts 119 attached to the separating structure 117, the bolts 120 that securely fasten the apparatus 100 to the cane 104 may be referred to as base bolts 120. Each base bolt 120 may pass through a respective opening on each side of the base 114 of the connecting apparatus 100. Aspects of the present disclosure are not limited to using two base bolts 120, additional or fewer base bolts 120 and/or other fastening devices may be used to fasten the connecting apparatus 100 to the cane 104. Additionally, as shown in the example of FIG. 1B, each base bolt 120 may receive a pin 122, such as a clevis pin with grooves, to secure the base bolt 120 on one side of the connecting apparatus 100. Each pin 122 may pass through an eye of a respective base bolt 120. In some examples, a retaining ring may be fastened to a groove of each pin 122. The pins 122 may be used to secure the bolts 120 to the base 114 when the connecting apparatus 100 is removed from the cane 104.

Figure 1C:
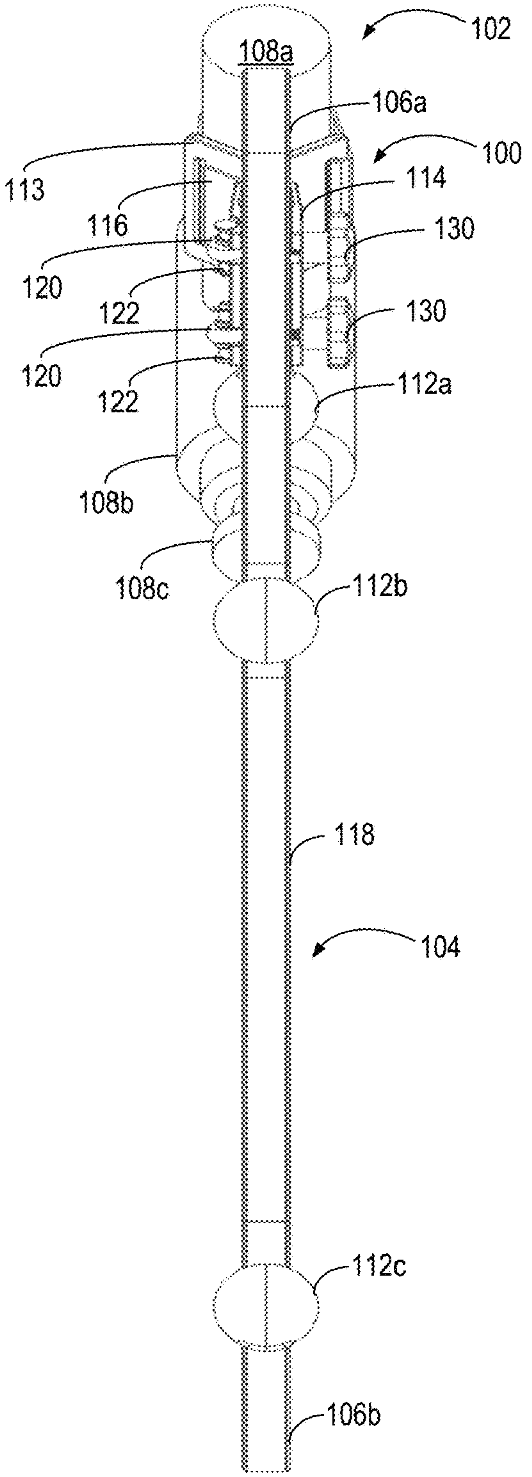
FIG. 1C is a diagram illustrating an example of a rear-facing view of a massage cane attached to a massage gun connecting apparatus that holds a massage gun, in accordance with various aspects of the present disclosure.

FIG. 1C is a diagram illustrating an example of a rear-facing view of a massage cane 104 attached to a massage gun connecting apparatus 100 that holds a massage gun 102, in accordance with various aspects of the present disclosure. In the example of FIG. 1C, the various elements associated with the massage gun connecting apparatus 100, the massage gun 102, and the massage cane 104 are the same as the elements described with respect to FIG. 1A. For brevity, a description of the elements in FIG. 1C that are the same as those described with reference to FIG. 1A is omitted.

As shown in FIG. 1C, when housed in the connecting apparatus 100, the massage gun 102 is vertically aligned with the cane 104. As discussed, the connecting apparatus 100 may be securely fastened to the cane 104 via a pair of base bolts 120. Additionally, as shown in the example of FIG. 1C, an end of each base bolt 120 may be secured via a respective knob 130. Each knob 130 may be placed on the side of the connecting apparatus 100 that is opposite to a side of the connecting apparatus 100 that is adjacent to each pin 122. Each knob 130 may be associated with one base bolt 120 and may be used to tighten or loosen an associated base bolt 120.

Figure 1D:
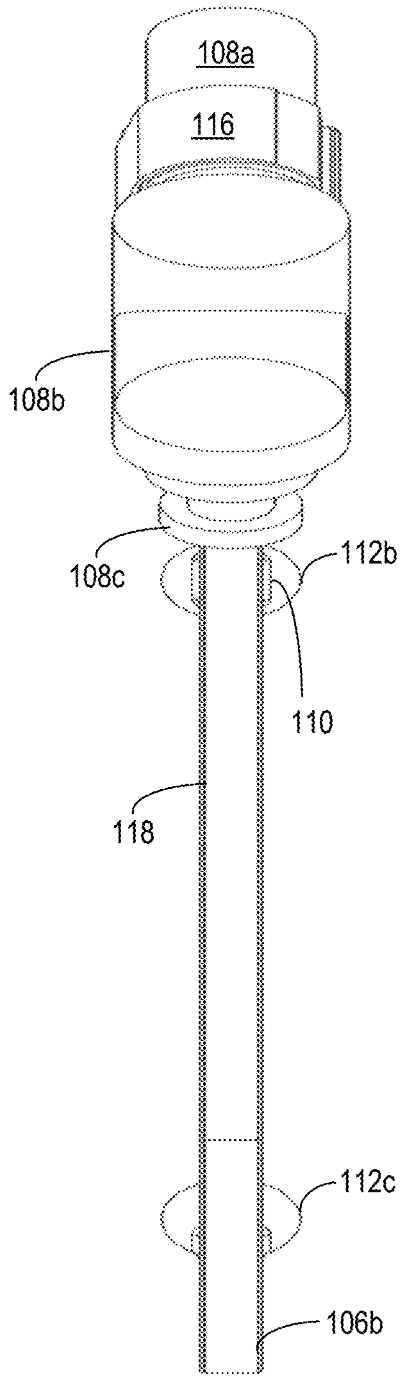
FIG. 1D is a diagram illustrating an example of a forward-facing view of the massage cane attached to the massage gun connecting apparatus that holds the massage gun, in accordance with various aspects of the present disclosure.

FIG. 1D is a diagram illustrating an example of a forward-facing view of the massage cane 104 attached to the massage gun connecting apparatus 100 that holds the massage gun 102, in accordance with various aspects of the present disclosure. In the example of FIG. 1D, various elements associated with the massage gun connecting apparatus 100, the massage gun 102, and the massage cane 104 are the same as the elements described with respect to FIG. 1A. For brevity, a description of the elements in FIG. 1D that are the same as those described with reference to FIG. 1A is omitted.

Figure 1E:
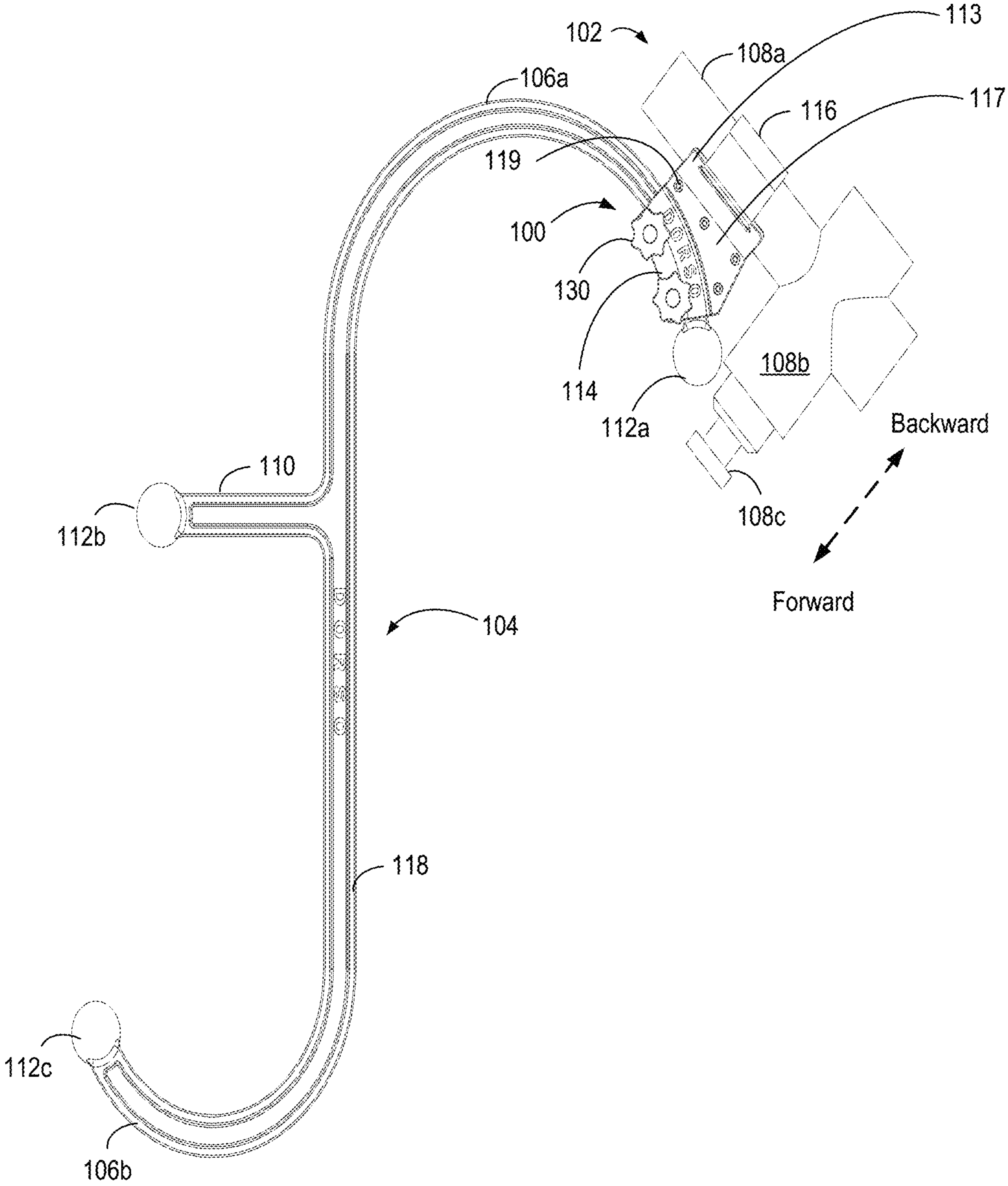
FIG. 1E is a diagram illustrating an example of a side view of the massage cane attached to the massage gun connecting apparatus that holds the massage gun, in accordance with various aspects of the present disclosure.

FIG. 1E is a diagram illustrating an example of a side view of the massage cane 104 attached to the massage gun connecting apparatus 100 that holds the massage gun 102, in accordance with various aspects of the present disclosure. In the example of FIG. 1D, various elements associated with the massage gun connecting apparatus 100, the massage gun 102, and the massage cane 104 are the same as the elements described with respect to FIG. 1A. For brevity, a description of the elements in FIG. 1D that are the same as those described with reference to FIG. 1A is omitted.

Figure 2A:
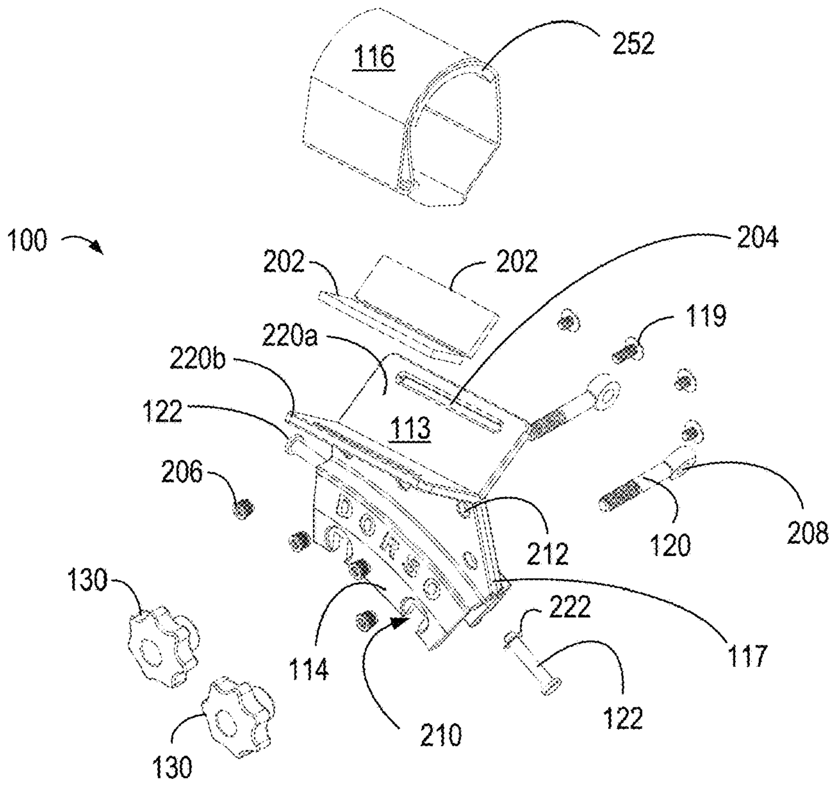
FIG. 2A is a diagram illustrating an example of the connecting apparatus, in accordance with various aspects of the present disclosure.

As discussed, the connecting apparatus 100 may attach to a portion of the massage cane 104. Furthermore, the massage gun 102 may be secure to a portion of the connecting apparatus 100. FIG. 2A is a diagram illustrating an example of the connecting apparatus 100, in accordance with various aspects of the present disclosure. The example of FIG. 2A shows a partially deconstructed view of the connecting apparatus 100. As shown in FIG. 2A, the support platform 113 may be attached to the base 114 via a separating structure 117. The separating structure 117 may extend vertically from the base 114. The support platform 113 may include two parts 220*a* and 220*b*, each part 220*a* and 220*b* extends at an upward angle, such as a forty-five-degree angle, from the separating structure 117. The support platform 113 and the separating structure 117 may form a Y-shape. Still, the support platform 113 is not limited to forming a Y-shape with the separating structure 117. The support platform 113 may have other designs, such as a flat design, an angled design, a curved design, or a circular design. Additionally, each part 220*a* and 220*b* may include an opening 204 for receiving the strap 116. Dimensions (e.g., width and height) of each opening 204 may be based on a width of the strap 116, such that the strap 116 may fit through each opening 204. As discussed, the support platform 113 may include padding 202 (e.g., adhesive padding) made of material, such as, but not limited to, foam or neoprene, to prevent the massage gun 102 from slipping or turning during use. Dimensions (e.g., width and height) of the padding 202 may be less than the dimensions of each part 202*a* and 202*b* of the platform 113, such that one padding 202 may be affixed to each part 202*a* and 202*b*. In some aspects, one piece of padding 202, such as a V-shape padding, may be affixed to each part 202*a* and 202*b* of the platform.

As discussed, in some implementations, the strap 116 may be connected to the separating structure 117 via one or more bolts 119. As shown in the example of FIG. 2A, one side of the strap 116 loops back, such that the strap 116 may be fastened to itself via a fastening mechanism, such as a hook and loop fastening mechanism. Other types of fastening mechanisms may be used for the strap 116. Additionally, the strap 116 may include padding 252 to further prevent the massage gun 102 from slipping or turning during use. Each bolt 119 may be secured via a nut 206. For brevity, only one nut 206 and one bolt 119 are numbered in FIG. 2A. Each nut 206 may be housed within an opening 212 in the separating structure 117. Each bolt 119 may be threaded through one nut 206 of the multiple nuts 206. Additionally, in some implementations, the connecting apparatus 100 may be split into two symmetrical pieces (not shown in FIG. 2A), separating the connecting apparatus 100 longitudinally. The bolts 119 and nuts 206 may be used to secure the symmetrical pieces together.

As discussed, the connecting apparatus 100 may be securely fastened to the cane 104 (not shown in FIG. 2A) via one or more base bolts 120. Each base bolt 120 may pass through a respective opening 210 on each symmetrical piece of the base 114 of the connecting apparatus 100. FIG. 2A illustrates two base bolts 120, aspects of the present disclosure are not limited to using two base bolts 120, additional or fewer base bolts 120 and/or other fastening devices may be used to fasten the connecting apparatus 100 to the cane 104. Additionally, as shown in the example of FIG. 1B, each base bolt 120 may receive a pin 122, such as a clevis pin with grooves, to secure the base bolt 120 on one side of the connecting apparatus 100. Each pin 122 may pass through an eye 208 of a respective base bolt 120. In some examples, a retaining ring 222 may be fastened to a groove of each pin 122. Additionally, as shown in the example of FIG. 2A, an end of each base bolt 120 may secured via a respective knob 130. A portion of each base bolt 120, or an entire body of each base bolt 120, may be threaded, such that each knob 130 may engage with a respective base bolt 120. Each knob 130 may be placed on a side of the connecting apparatus 100 that is opposite to a side of the connecting apparatus 100 that is adjacent to each pin 122. Furthermore, each knob 130 may be associated with one base bolt 120 and may be used to tighten or loosen an associated base bolt 120.

Figure 2B:
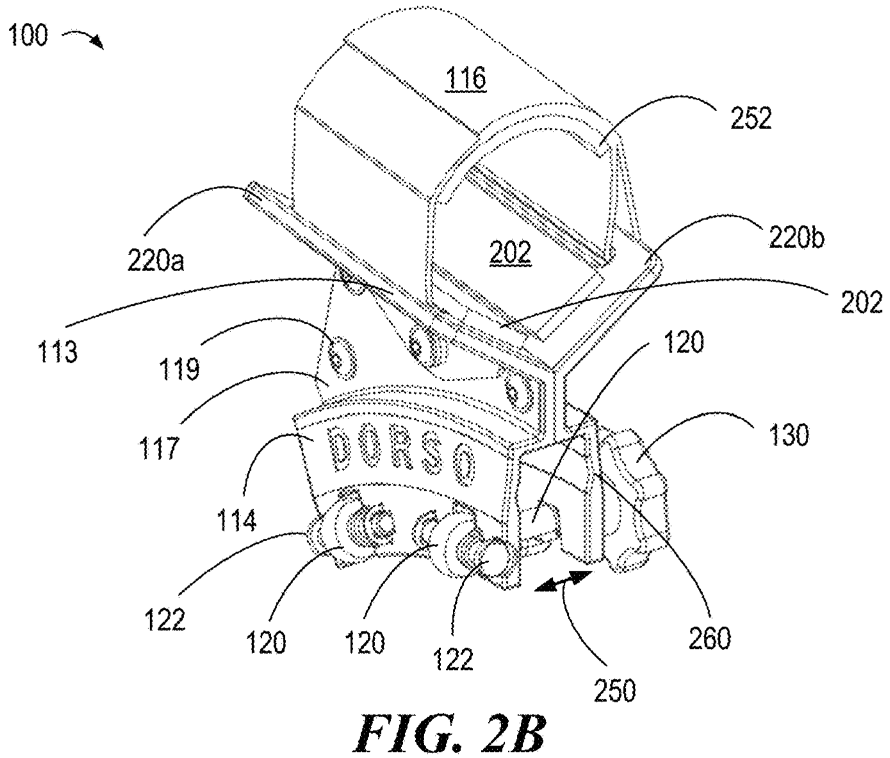
FIG. 2B is a diagram illustrating an example of the connecting apparatus, in accordance with various aspects of the present disclosure.

FIG. 2B is a diagram illustrating an example of the connecting apparatus 100, in accordance with various aspects of the present disclosure. The example of FIG. 2B shows a constructed view of the connecting apparatus 100. In the example of FIG. 2B, various elements associated with the massage gun connecting apparatus 100 are the same as the elements as described with respect to FIG. 2A. For brevity, a description of the elements in FIG. 2B that are the same as those described with reference to FIG. 2A is omitted.

As shown in the example of FIG. 2B, each base bolt 120 may pass through a gap 250 between symmetrical pieces of the base 114. The cane 104 may pass through the gap 250 above a portion of each base bolt 120 that is within the gap 250. Furthermore, as shown in the example of FIG. 2B, in some implementations, the base 114 may include an indentation 260 on each symmetrical piece to accommodate canes 104 with different dimensions, such as canes with different widths. The indentation 260 may run along the length of the base 114. As shown in FIG. 2B, the base 114 may curve to conform to a curved shape of an end of a cane 104.

Additionally, as shown in FIG. 2B, each side of the base 114 extends outwards from the separating structure 117. Furthermore, each side of the base 114 extends downward to form a wall, such that the gap 250 (e.g., opening) is formed to receive the cane 104. Specifically, the gap 250 is created by the walls of the base 114. The cane 104 passes through the gap 250 and each wall of the base 114 is adjacent to a respective side of a portion (e.g., curved portion) of the cane 104.

Figure 2C:
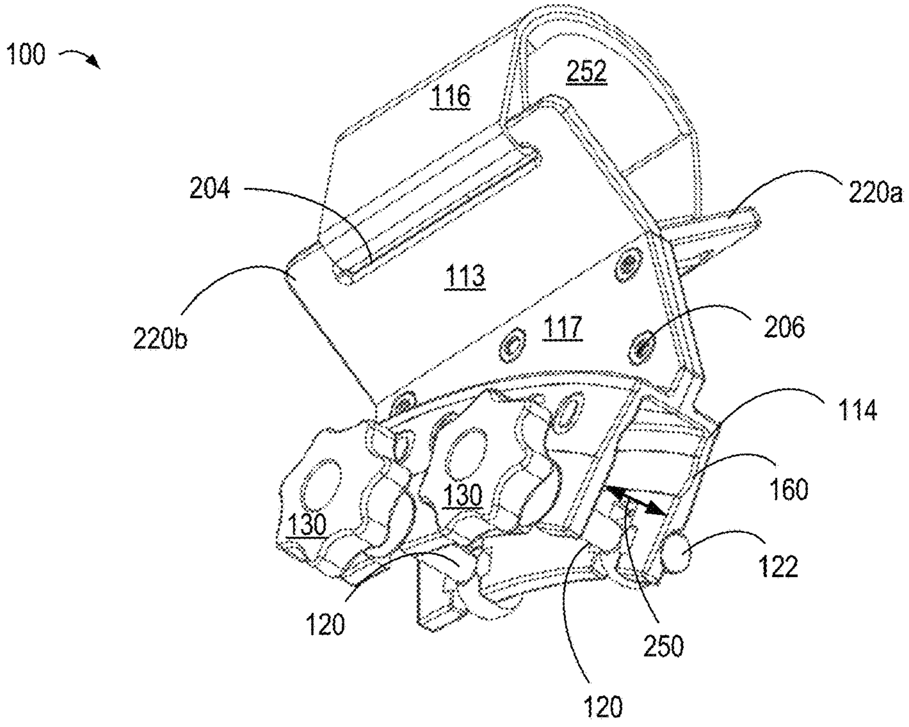
FIG. 2C is a diagram illustrating a perspective view of an example of the connecting apparatus, in accordance with various aspects of the present disclosure.

FIG. 2C is a diagram illustrating a perspective view of an example of the connecting apparatus 100, in accordance with various aspects of the present disclosure. In the example of FIG. 2C various elements associated with the massage gun connecting apparatus 100 are the same as the elements described with respect to FIG. 2A. For brevity, a description of the elements in FIG. 2C that are the same as those described with reference to FIG. 2A is omitted.

Figure 2D:
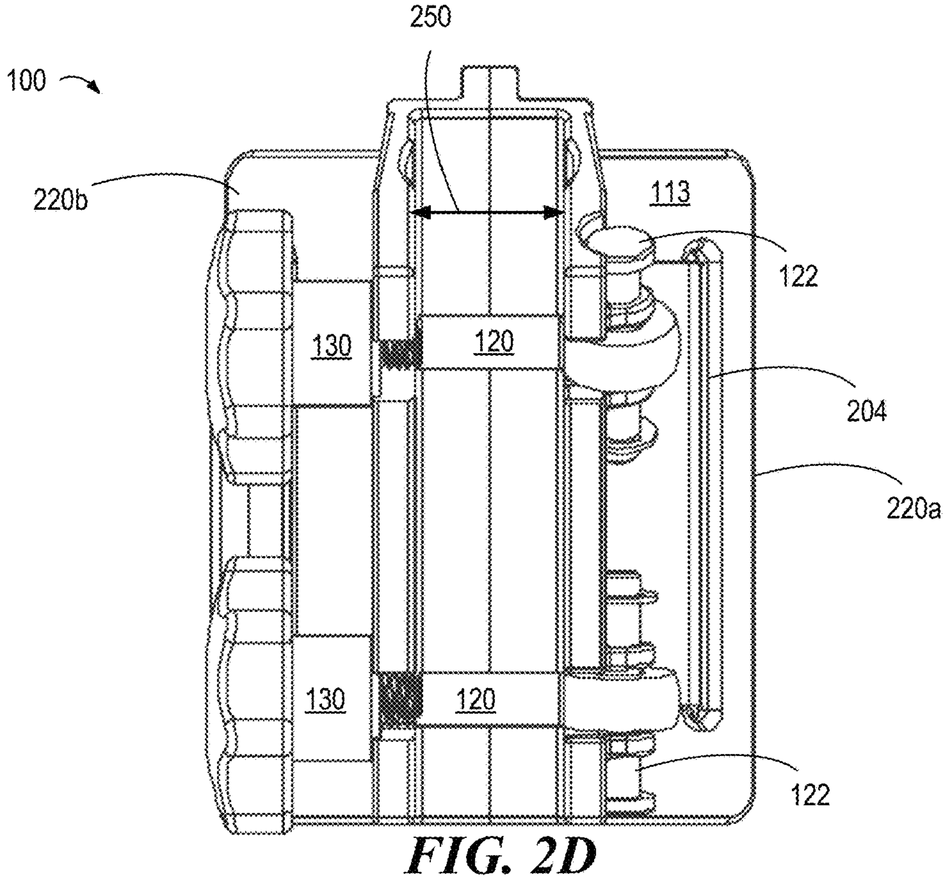
FIG. 2D is a diagram illustrating a bottom-up view of an example of the connecting apparatus, in accordance with various aspects of the present disclosure.

FIG. 2D is a diagram illustrating a bottom-up view of an example of the connecting apparatus 100, in accordance with various aspects of the present disclosure. In the example of FIG. 2D, various elements associated with the massage gun connecting apparatus 100 are the same as the elements described with respect to FIG. 2A. For brevity, a description of the elements in FIG. 2D that are the same as those described with reference to FIG. 2A is omitted.

Figure 2E:
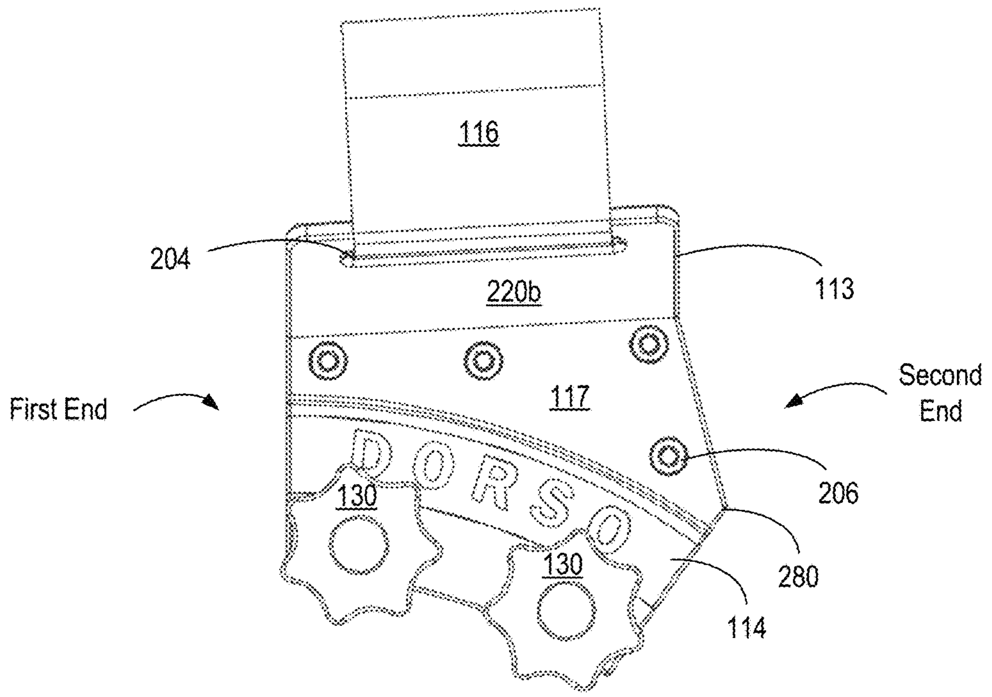
FIG. 2E is a diagram illustrating a bottom-up view of an example of the connecting apparatus, in accordance with various aspects of the present disclosure.

FIG. 2E is a diagram illustrating a bottom-up view of an example of the connecting apparatus 100, in accordance with various aspects of the present disclosure. In the example of FIG. 2E, various elements associated with the massage gun connecting apparatus 100 are the same as the elements described with respect to FIG. 2A. For brevity, a description of the elements in FIG. 2E that are the same as those described with reference to FIG. 2A is omitted.

As discussed, the base 114 may be curved to accommodate a curve of the cane 104. In the example of FIG. 2E, the base 114 curves downward. In some implementations, one end of the apparatus 100 (shown as the First End in FIG. 2E) is vertical from a bottom edge of the base 114 to a top edge of the platform 113. At an opposite end of the apparatus 100 (shown as the Second End in FIG. 2E), an end of the base 114 may be at an angle, such as an upward angle moving away from the first end. At a point 280 at the second end, the separating structure 117 may be defined at an angle towards the first end.

Figure 2F:
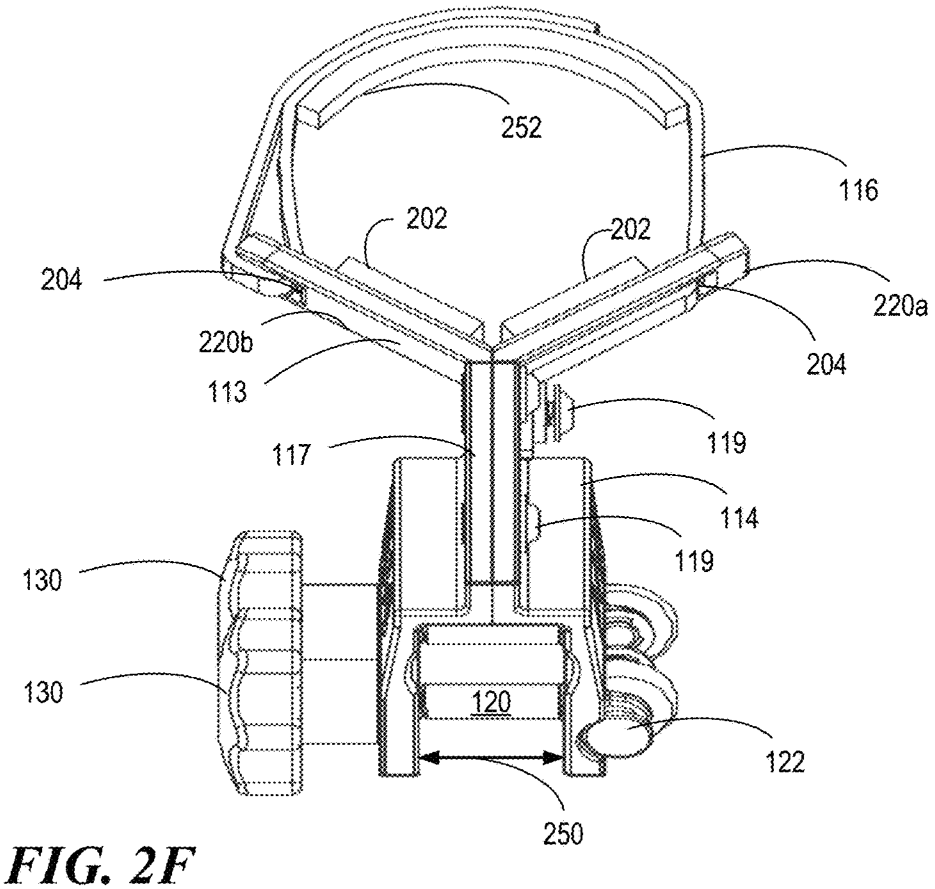
FIG. 2F is a diagram illustrating a forward-facing view of an example of the connecting apparatus, in accordance with various aspects of the present disclosure.

FIG. 2F is a diagram illustrating a forward-facing view of an example of the connecting apparatus 100, in accordance with various aspects of the present disclosure. In the example of FIG. 2F, various elements associated with the massage gun connecting apparatus 100 are the same as the elements described with respect to FIG. 2A. For brevity, a description of the elements in FIG. 2F that are the same as those described with reference to FIG. 2A is omitted.

Various aspects of the present disclosure have described an apparatus that is fastened to a cane, such that a massage gun may be secured to the apparatus. In some other aspects, the apparatus may be permanently affixed to the cane. That is, the base, such as the base 114 described with reference to FIGS. 1A-1E and 2A-2F, may be permanently affixed to a portion of the cane.

Figure 3:
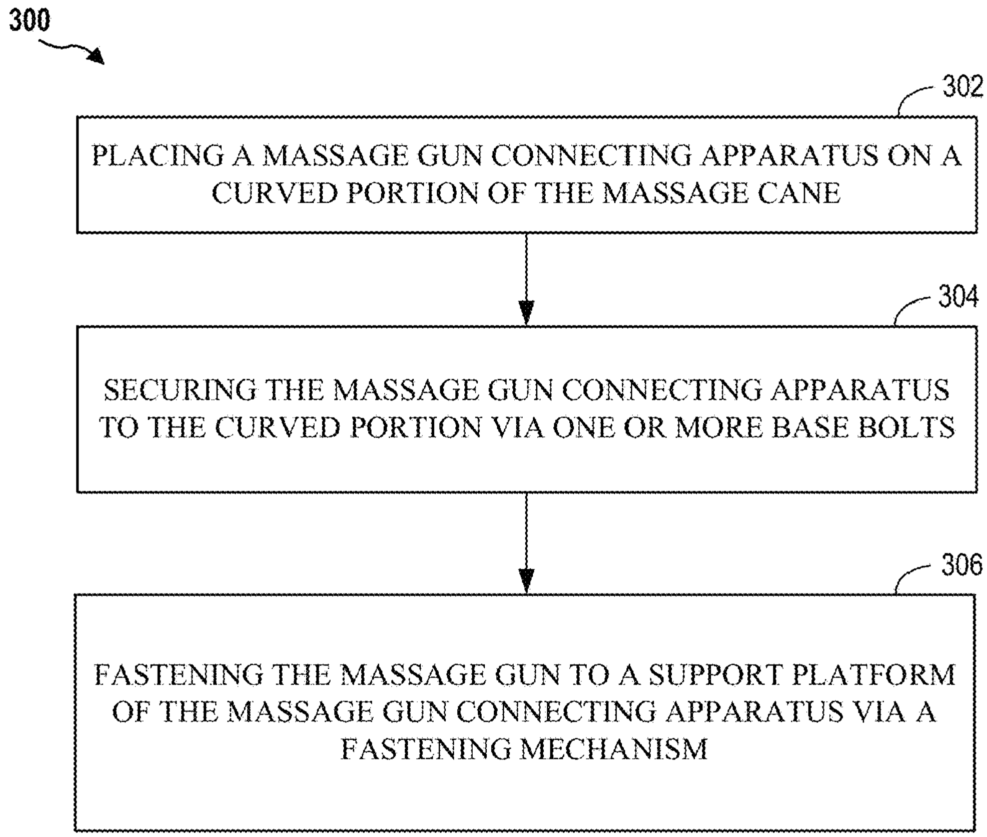
FIG. 3 is a flow diagram illustrating an example process performed in accordance with various aspects of the present disclosure.

FIG. 3 is a flow diagram illustrating an example process 300 performed in accordance with various aspects of the present disclosure. The example process 300 is an example of attaching a massage gun to a cane. The process 300 may be performed by a connecting apparatus 100 as described with reference to FIGS. 1A-1E and 2A-2F, a massage gun 102 as described with reference to FIGS. 1A-1E, and a cane as described with reference to FIGS. 1A-1E. As shown in FIG. 3, the process 300 begins at block 302 by placing a massage gun connecting apparatus on a curved portion of the massage cane.

At block 304, the process 300 secures the massage gun connecting apparatus to the curved portion via one or more base bolts. In some examples, the one or more base bolts are eye bolts. Each of the one or more base bolts may pass through a hole in the base. Additionally, a clevis pin may pass through each eye of each of the one or more base bolts. Each of the one or more base bolts may be tightened via a respective knob of one or more knobs. The massage gun connecting apparatus may be secured to the curved portion based on tightening each of the one or more base bolts At block 306, the process 300 fastens the massage gun to a support platform of the massage gun connecting apparatus via a fastening mechanism. In some examples, the fastening mechanism is a strap. In such examples, a first end of the strap passes through a first opening of the support platform and is secured to the separating structure and a second end of the strap loops through a second opening of the support platform and is secured to a body of the strap. In some such examples, the strap includes a pad that engages the massage gun. As discussed, the fastening mechanism is not limited to a strap and may be another type of fastening mechanism, such as a clamp or a hook and loop fastener. As an example, one portion of a hook and loop fastener may be attached to the support platform and another portion of the hook and loop fastener may be attached to the massage gun, such that the massage gun is secured to the support platform when the one portion of the hook and loop fastener attaches to the other portion.

In some examples, a head of the massage gun faces a vertical handle of the cane when the massage gun is fastened to the support platform. The head provides percussion therapy to a muscle or body part of a user. The head may be attached to a body of the massage gun, the body may be attached to a handle of the massage gun, and the handle may be fastened to the support platform. In some examples, the body is perpendicular to the handle. Still, the body is not limited to being perpendicular to the handle.

The foregoing disclosure provides illustration and description, but is not intended to be exhaustive or to limit the aspects to the precise form disclosed. Modifications and variations may be made in light of the above disclosure or may be acquired from practice of the aspects.

As used, the term “component” is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. An apparatus for connecting a massage gun to a massage cane, comprising:

a support platform for supporting the massage gun, the support platform comprising a first part and a second part, each of the first part and the second part being attached to a fastening mechanism for fastening the massage gun to the support platform, the support platform having opposing front and rear distal ends aligned along a longitudinal axis;

a base comprising opposing curved sidewalls defining a curved opening for receiving a curved portion of the massage cane, the curved sidewalls including an assembly for securing the base to the curved portion of the massage cane, the base having opposing front and rear distal ends aligned with the longitudinal axis, the rear distal end of the base being aligned with the rear distal end of the support platform, and the front distal end of the base extending forward beyond the front distal end of the support platform; and a separating structure for connecting the base to the support platform, each of the first part and the second part meeting at a planar junction surface and diverging upwardly from the planar junction surface, such that the first part and the second part extend away from each other at a non-zero angle relative to the separating structure, the curved sidewalls being sloped downward at a non-zero angle relative to the planar junction surface.

2. The apparatus of claim 1, wherein the base comprises one or more base bolts for securing the base to the cane.

3. The apparatus of claim 2, wherein:

the one or more base bolts are eye bolts;

a clevis pin passes through each eye of the one or more base bolts; and each base bolt passes through a hole in the base; and an end of each base bolt is secured via a respective knob of one or more knobs.

4. The apparatus of claim 1, wherein a pad is attached to each of the first part and the second part.

5. The apparatus of claim 1, wherein:

the apparatus comprises two symmetrical parts; and the two symmetrical parts are attached to each other at the separating structure.

6. The apparatus of claim 1, wherein:

the separating structure extends vertically from the base;

the rear distal end of the separating structure being aligned with the rear distal end of the support platform;

the front distal end of the separating structure extending forward beyond the front distal end of the support platform.

7. The apparatus of claim 1, wherein:

a head of the massage gun faces a vertical handle of the cane when the massage gun is fastened to the support platform; and the head provides percussion therapy to a muscle or body part of a user.

8. The apparatus of claim 7, wherein:

the head is attached to a body of the massage gun;

the body is attached to a handle of the massage gun; and the handle is fastened to the support platform.

9. The apparatus of claim 8, wherein the body is perpendicular to the handle.

10. The apparatus of claim 1, wherein:

the fastening mechanism is a strap;

a first end of the strap passes through a first opening of the support platform and is secured to the separating structure; and a second end of the strap loops through a second opening of the support platform and is secured to a body of the strap.

11. The apparatus of claim 10, wherein the strap comprises a pad that engages the massage gun.

12. A method for attaching a massage gun to a massage cane, comprising:

placing a massage gun connecting apparatus on a curved portion of the massage cane, massage gun connecting apparatus comprising:

a support platform for supporting the massage gun, the support platform comprising a first part and a second part, each of the first part and the second part being attached to a fastening mechanism for fastening the massage gun to the support platform, the support platform having opposing front and rear distal ends aligned along a longitudinal axis;

a base comprising opposing curved sidewalls defining a curved opening for receiving the curved portion of the massage cane, the base having opposing front and rear distal ends aligned with the longitudinal axis, the rear distal end of the base being aligned with the rear distal end of the support platform, and the front distal end of the base extending forward beyond the front distal end of the support platform; and a separating structure for connecting the base to the support platform, each of the first part and the second part meeting at a planar junction surface and diverging upwardly from the planar junction surface, such that the first part and the second part extend away from each other at a non-zero angle relative to the separating structure, the curved sidewalls being sloped downward at a non-zero angle relative to the planar junction surface;

securing the massage gun connecting apparatus to the curved portion via one or more base bolts defined at the base; and fastening the massage gun to a support platform of the massage gun connecting apparatus via the fastening mechanism.

13. The method of claim 12, wherein:

the fastening mechanism is a strap;

a first end of the strap passes through a first opening of the support platform and is secured to the separating structure; and a second end of the strap loops through a second opening of the support platform and is secured to a body of the strap.

14. The method of claim 13, wherein the strap comprises a pad that engages the massage gun.

15. The method of claim 13, wherein:

the one or more base bolts are eye bolts;

each of the one or more base bolts passes through a hole in the base; and the method further comprises:

passing a clevis pin through each eye of each of the one or more base bolts; and tightening each of the one or more base bolts via a respective knob of one or more knobs.

16. The method of claim 15, wherein the massage gun connecting apparatus is secured to the curved portion based on tightening each of the one or more base bolts.

17. The method of claim 13, wherein:

a head of the massage gun faces a vertical handle of the cane when the massage gun is fastened to the support platform; and the head provides percussion therapy to a muscle or body part of a user.

18. The method of claim 17, wherein:

the head is attached to a body of the massage gun;

the body is attached to a handle of the massage gun;

the handle is fastened to the support platform; and the body is perpendicular to the handle.

19. The apparatus of claim 1, wherein:

the separating structure comprises a first wall and a second wall;

the first wall, first part, and a first curved sidewall of the opposing curved sidewalls form a first symmetrical piece;

the second wall, second part, and a second curved sidewall of the opposing curved sidewalls form a second symmetrical piece; and the first symmetrical piece and the second symmetrical piece are coupled together to form the apparatus.

20. The apparatus of claim 1, wherein each of the first part and the second part comprise a horizontal opening for receiving the fastening mechanism.

* * * * *